United States Patent [19]

Vestergaard

[11] 4,166,341
[45] Sep. 4, 1979

[54] METHOD AND APPARATUS FOR CULTIVATION OF PLANTS GROWN SINGLY IN SEPARATE BEDS

[76] Inventor: Bent Vestergaard, 5 Hoeholmvej, 26 Taastrup, Denmark

[21] Appl. No.: 834,974

[22] Filed: Sep. 20, 1977

Related U.S. Application Data

[63] Continuation-in-part of Ser. No. 604,155, Aug. 13, 1975, abandoned.

[30] Foreign Application Priority Data

Aug. 13, 1974 [DK] Denmark .............................. 4300/74
May 28, 1975 [DK] Denmark .............................. 3095/75

[51] Int. Cl.² .............................................. A01G 31/02
[52] U.S. Cl. ............................................ 47/59; 47/65
[58] Field of Search ...................................... 47/59–65, 47/17

[56] References Cited

U.S. PATENT DOCUMENTS

| 2,189,510 | 2/1940 | Swaney | 47/59 |
| 2,486,512 | 11/1949 | Armstrong | 47/59 |
| 3,254,447 | 6/1966 | Ruthner | 47/59 |
| 3,579,907 | 5/1971 | Graves | 47/17 |
| 3,771,258 | 11/1973 | Charney | 47/59 |
| 3,835,584 | 9/1974 | Shimazu | 47/59 X |
| 3,927,491 | 12/1975 | Farnsworth | 47/59 |
| 4,028,847 | 6/1977 | Davis et al. | 47/65 |

*Primary Examiner*—Robert E. Bagwill
*Attorney, Agent, or Firm*—Kenyon & Kenyon

[57] ABSTRACT

A system for growing plants in spaced apart individual root support beds in elongated U-shaped channels. Each channel has guides for an elongated member to support the root beds above the bottom of the channel and at least one interior duct extending along the length of the channel above the elongated member to deliver cultivation-regulating media through longitudinally spaced outlets. Surplus liquid drains off through the space between the member and the bottom of the channel, carrying away noxious substances from the plants. The top of each channel may be closed by a pair of flexible opaque flaps which yieldingly embrace the stems of plants in the channel to reduce moisture loss and exclude light from the plant roots. The spacing between adjacent channels is varied according to the stage of plant growth, either by arranging the channels in a fixed expanding pattern and moving the plants progressively along the channels or by shifting groups of parallel channels sideways as the plants mature. In particular, a number of parallel channels may be divided into two groups. One group is closely spaced and contains plants at an intermediate stage. The second group is spaced further apart and contains plants in a final stage. After harvesting the mature plants, the second group of channels is shifted to close spacing, providing room to shift the first group further apart.

21 Claims, 18 Drawing Figures

METHOD AND APPARATUS FOR CULTIVATION OF PLANTS GROWN SINGLY IN SEPARATE BEDS

CROSS-REFERENCE TO RELATED APPLICATION

This is a continuation-in-part of copending U.S. patent application Ser. No. 604,155 filed on Aug. 13, 1975 and now abandoned.

BACKGROUND OF THE INVENTION

1. Field of the Invention

This invention relates to apparatus for growing plants singly in individual spaced-apart root support beds and to a method for cultivating the plants in said apparatus and for varying the spacing of the plants according to their growth stage. In particular, the invention relates to a system of elongated channels having interior ducts for continuously supplying fluid growth regulating media to plants spaced apart on elongated members above the bottoms of the channels, the spacing between corresponding plants in adjacent channels being increased as the plants mature.

2. Description of the Prior Art

The art known as hydroponics of growing plants in nutrient solutions, with or without a porous inert medium to provide mechanical support, has been practiced with oblong boxes filled to a predetermined level with an aqueous nutrient solution. The plants are typically supported on a holding stand such as a perforated cover on each box that allows the roots of the plants to depend into the nutrient solution, as shown in U.S. Pat. No. 2,189,510 issued Feb. 6, 1940 to M. W. Swaney.

In the Swaney patent, individual plants are held in support blocks set in spaced holes in the cover. The plants can be rearranged by shifting them to different holes in the cover. Because the plant roots continually excrete toxic matter, the nutrient solution in the boxes must be drained and replaced by fresh solution periodically.

Another procedure for increasing the spacing of plants grown hydroponically is shown in U.S. Pat. No. 3,927,491 issued to R. S. Farnsworth. The plants are placed initially on small buoyant rafts spaced close together and floating in a nutrient solution. As the plants grow larger and heavier, the small rafts are placed on larger rafts, which provide greater buoyancy and increased lateral spacing.

In conventional soil cultivation of plants grown singly in individual pots, it is a known procedure to transplant to larger pots and to increase the spacing between pots, as described in "Crysanthemums The Year Round" by Searle and Machin, published by Blandford Press, London in 1968.

Still another system for increasing the space between plants as they grow is disclosed in U.S. Pat. No. 3,254,447 issued to O. Ruthner on June 7, 1966. The Ruthner system comprises a ladder-like conveyor belt having elongated vertically oriented loops. Plant containers are suspended from spaced transverse bars or "rungs" of the conveyor belt. The belt moves continuously, and the containers dip into open receptacles of nutrient solution periodically each time they traverse a lower reversing point between two vertical paths of the belt. In embodiments shown in FIGS. 9 and 10 of the patent, the belt follows a serpentine path, and the spacing between adjacent vertical loops increases to accommodate progressively larger plants as they mature.

Thus, it is well known in the prior art of hydroponics cultivation that the nutrient solution supplied to the plants must be replenished or replaced periodically to avoid excessive buildup of toxins excreted by the plants. It is also known to minimize the area required for growing plants by cultivating the plants singly in individual beds or pots and by shifting the beds or pots to provide more space as the plants grow larger.

SUMMARY OF THE INVENTION

It is an object of the present invention to provide an improved apparatus and method adapted for fully automated continuous supply of fresh cultivation regulating media to and continuous draining off of surplus media from a larger number of plants growing singly in individual spaced apart root support beds.

It is another object of the invention to provide an improved apparatus and method for increasing the spacing between large numbers of plants grown singly in individual root support beds with a minimum expenditure of labor or energy.

These and other objects are achieved by use of apparatus for cultivating a multiplicity of plants grown singly in individual root support beds, the apparatus comprising an elongated U-shaped channel having a bottom and a pair of spaced upright sides. Guides extend the length of the interior face of each side parallel to and spaced between the bottom and the upper margin or each side.

An elongated member such as a horizontal conveyor belt is supported by the guides along the length of the channel and is adapted to support individual porous root support beds of single plants so that they are spaced above the bottom of the channel.

At least one continuous, preferably integral, duct extends the length of the channel along the interior surface of at least one of the sides. The duct has longitudinally spaced outlets adapted to deliver liquid growth or cultivation-regulating media from the duct to the interior of the channel above the elongated member, the space between the member and the bottom of the channel being adapted to carry off surplus liquid cultivation-regulating media drained from said member.

The apparatus may further comprise a pair of flexible opaque flaps, each flap being attached to the upper margin of a respective side of the channel and extending upwardly and inwardly therefrom. The flaps terminate in a pair of adjacent lips extending the length of the channel, the lips being adapted to yieldingly embrace the stems of plants in the channel to permit growth and longitudinal movement of such plants in the channel while reducing moisture loss from the channel and protecting the plant roots from exposure to light. The flaps also prevent condensation of moisture from the channel on the undersides of the plant leaves and prevent growth of algae in the channel.

The elongated member, which is supported in the guides and in turn supports the spaced apart plants, preferably has a flat central part and raised side margins to form a reservoir for liquid cultivation-regulating media. The raised side margins may comprise upright side portions, preferably with turned-in upper edges adapted to secure a root complex of plants growing in the channel and to restrain the roots from growing out of the reservoir.

The apparatus of the invention also includes devices adapted to increase the spacing of individual plants in the channel. One embodiment of such a device comprises a plurality of carrier sections for individual plant beds movably aligned along the elongated member and a fexible line connecting each of the carrier sections together. The line between adjacent carrier sections has a predetermined length equal to the maximum desired spacing between the plants.

An alternative embodiment comprises a plurality of carrier sections and spring means connecting adjacent sections; so that the spacing between sections is determined by the tension exerted on the spring means.

Another embodiment of a plant spacing device comprises a plurality of linearly spaced spring-actuated coilers adapted to extend along one side of a conveyor belt. A carrier arm is mounted on each coiler for rotation therewith, and lengths of wire connect adjacent coilers. The wires are adapted to be wound on the coilers by the actuating springs and to be unwound in response to tension exerted on the wires. As the wires unwind, the carrier arms are turned and adapted to contact corresponding plant beds on the conveyor belt and to push said beds further apart with increasing tension in the wires.

Still another spacing device embodiment comprises a plurality of holders spaced on a wire adapted to extend along one side of a conveyor belt. A carrier arm is pivotally mounted on each holder and bears resiliently against a stop with the arm perpendicular to the wire; so that the arm is adapted to extend across the conveyor belt when the wire is pulled in one direction the carrier arm swings away from the stop against the resilient force when the wire is pulled in the opposite direction.

In addition to providing means for increasing the spacing of individual plants in a channel of the apparatus, the invention further provides a system comprising a multiplicity of elongated channels arranged in straight parallel lines and means for supporting the channels for lateral movement transverse to their longitudinal axes; so that the spacing between adjacent channels can be adjusted according to the size of plants in the channels.

The system further may include a header extending perpendicularly to the longitudinal axes of the channels adjacent to one end thereof for supplying fluid cultivation-reguating media under pressure. A multiplicity of flexible tubes is connected between a respective multiplicity of outlets spaced along the header and the corresponding channels for delivering the liquid cultivation-regulating media from the header to the one end of each channel while permitting lateral shifting of said channels on the support means. Preferably, the system also includes motorized means for laterally shifting the channels on the support means.

At the other ends of the channels, the system provides an open trough extending perpendicularly to the longitudinal axes of the channels directly underneath said other ends for carrying away surplus liquid cultivation-regulating media drained from the channels.

The method of the invention comprises broadly the steps of arranging linearly spaced individual beds of single plants on support surfaces in at least two adjacent horizontal channels, the support surfaces being spaced above the bottoms of the respective channels; continuously flowing cultivation-regulating media into each channel to supply the media to the individual beds; continuously draining off noxious substances from the plants in the space between each support surface and the bottom of each channel; increasing the spacing between adjacent beds in each channel in accordance with the space required by the growing plants; and increasing the spacing between beds in adjacent channels correspondingly.

The invention contemplates performing the step of increasing the spacing between the beds in adjacent channels in several ways. In one aspect of the method, the channels are straight and parallel to each other, and the spacing is increased by shifting at least one channel parallel to itself. Alternatively, straight channels may be arranged to diverge from one end to the other end, and the spacing between corresponding beds in adjacent channels is increased by moving the beds progressively through the channels from the one end to the other end as the plants mature.

In another aspect of the invention the plant beds are arranged in at least two pairs of straight, parallel channels on the same level, the beds in each channel are moved progressively along each channel from one end to the other end. The other ends of each adjacent pair of channels are joined to a single further channel extending in the same direction intermediate said pair of channels and the beds are moved in the same direction from each pair of channels to the corresponding single channel.

In still another aspect, the method comprises arranging the beds in a continuous serpentine channel with the distance between adjacent loops increasing from one loop to the next, and moving the beds progressively along the continuous serpentine channel as the plants mature.

A preferred aspect of the method, in which alternate cycles of plants are grown in a constant area, is practiced by arranging a first group of plants in an early first stage of development in at least two adjacent channels forming one portion of a set of straight parallel channels on the same level. The channels in the one portion of the set are spaced a first predetermined distance smaller than the spacing between at least two additional channels forming a second portion of the set.

When the plants reach a second stage of development, the spacing between adjacent ones of the channels of the one portion is increased by shifting the channels parallel to themselves until the spacing between the channels in the one portion is equal to a second predetermined distance. At the same time, the spacing between the channels in the second portion of the set is decreased so that the total area occupied by the set remains constant. A second group of plants in the first stage of development is then arranged in the channels of the second portion of the set.

After the first group of plants has reached a third stage of development, the plants are removed successively from one end of the first portion of channels. The spacing between the channels of the one portion is then decreased to the first predetermined distance, and the spacing between channels of the second portion is increased to the second predetermined distance. The cycle continues by arranging a third group of plants in the first stage of development in the channels of the one portion of the set.

The apparatus and method of the present invention thereby provide a system in which a continuous supply of cultivation-regulating media will deliver an exact dosage to the plants in the channels according to their condition of growth. At the same time surplus quantities of the cultivation-regulating media continuously drain off in the bottoms of the channels below the beds and roots, carrying with them the toxic materials excreted by the plants during growth. Because the plant roots are in contact only with fresh cultivation-regulating media at all times, residual toxins in the plants may be reduced to a level previously unobtainable.

In addition to a solution of nutrient salts supplied to the plant through spaced outlets in an interior duct extending the length of the channel, additional ducts may deliver other cultivation-regulating media, such as carbon dioxide ($CO_2$) and oxygen-containing nutritive fluid, or may circulate warm or cool fluids through the channels to maintain the desired thermal environment.

The foregoing and other benefits of the present invention will become more apparent from the following description of the preferred embodiments, in connection with the accompanying drawings.

DESCRIPTION OF THE PREFERRED EMBODIMENTS

A basic feature of the present invention for cultivating plants is an elongated channel for holding the plants in spaced apart relation and for providing the necessary growth-inducing environment to the root systems of the plants.

Figure 1:
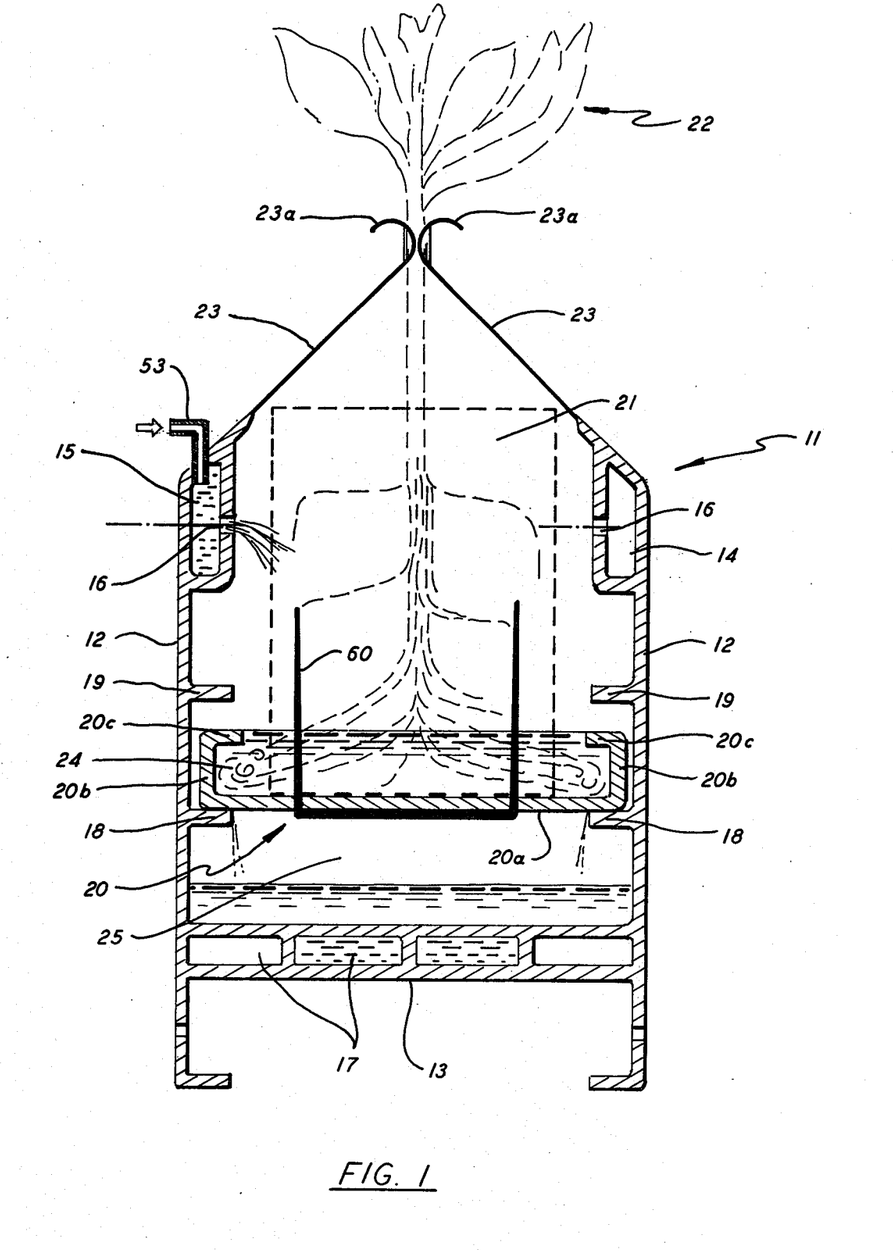
FIG. 1 is a cross-section of a channel for growing plants singly in spaced apart individual root support beds on an elongated support member carried by guides above the bottom of the channel.

Referring to FIG. 1, a preferred design comprises a U-shaped channel 11 having parallel upright sides 12 and a bottom 13. Other channel forms may be used, however, as for example a channel in the form of a tube slotted longitudinally to provide a top opening corresponding to the upper opening of a U-shaped channel.

Internal ducts 14 and 15, integrally formed in sides 12 adjacent to their upper margins, extend the length of channel 11. Each of the ducts has longitudinally spaced outlets 16 for delivering cultivation-regulating fluid media to the interior of the channel. Along the bottom of the channel extend additional closed ducts 17 which are adapted to circulate a temperature regulating medium such as warm water in order to maintain a desired constant temperature in the lower part of the channel.

Two sets of lower guides 18 and upper guides 19, spaced vertically between the bottom and upper margins of the sides, extend the length of the channel for slidably carrying an elongated member 20, such as a conveyor belt. Member 20 is adapted to support a number of individual plant root support beds, preferably in the form of a porous block 21 (shown in dashed outline form). Each root support bed holds a single plant 22.

A pair of flexible opaque flaps 23 are attached to the respective upper margins of sides 12 and extend inwardly and upwardly to meet in a pair of lips 23a. The lips embrace the stem of each plant 22 but yield to allow movement of the plants through the channel.

Elongated support member 20 is preferably formed with a flat central part 20a and upright side portions 20b having turned-in upper edges 20c. The upright sides form a liquid reservoir 24 for cultivation-regulating liquid media supplied from at least one of the ducts 14, 15. The turned-in edges are adapted to secure a root complex of plants growing in the channel and to restrain root growth out of the reservoir. In this way, root formation along the center of the belt is encouraged, and the edges of the belt are kept free during the initial period of growth. In a short time, therefore, the roots of the spaced apart plants approach each other and form a continuous longitudinal wick that provides firm support to the plants as they grow larger, particularly as the root complex extends under the turned-in edges of the belt.

As mentioned earlier, the plants are continuously supplied with cultivation-regulating media from the ducts above the elongated support member. Such media may include fresh oxygen-containing nutritive fluid supplied to the ducts under pressure. The fluid squirts out of outlets 16 to provide an even dosage to the plants throughout the whole length of the channel; so that lack of oxygen is avoided.

Surplus fluid overflows the edges of the belt, passing into drainage space 25 between the belt and the bottom of the channel, from whence it can be led to a reception tank (not shown).

Other cultivation-regulating media that can be delivered through the ducts include $CO_2$, hot or cold air, systemic poisons for treating plant diseases, algae preventives, growth retarding or flower-inducing media, root developers, and so forth. In the case of gaseous media, such as $CO_2$, the flap arrangement covering the channel opening permits slow circulation of the gas up around the leaves of the plant, for economical dosage with minimum waste.

The provision of two sets of guides 18 and 19 allows the belt height to be changed, depending on the size of root support block being used. If the elongated member is a conveyor belt, the upper guides can carry the belt in one direction and the lower guides can carry it in the return direction.

Figure 2:
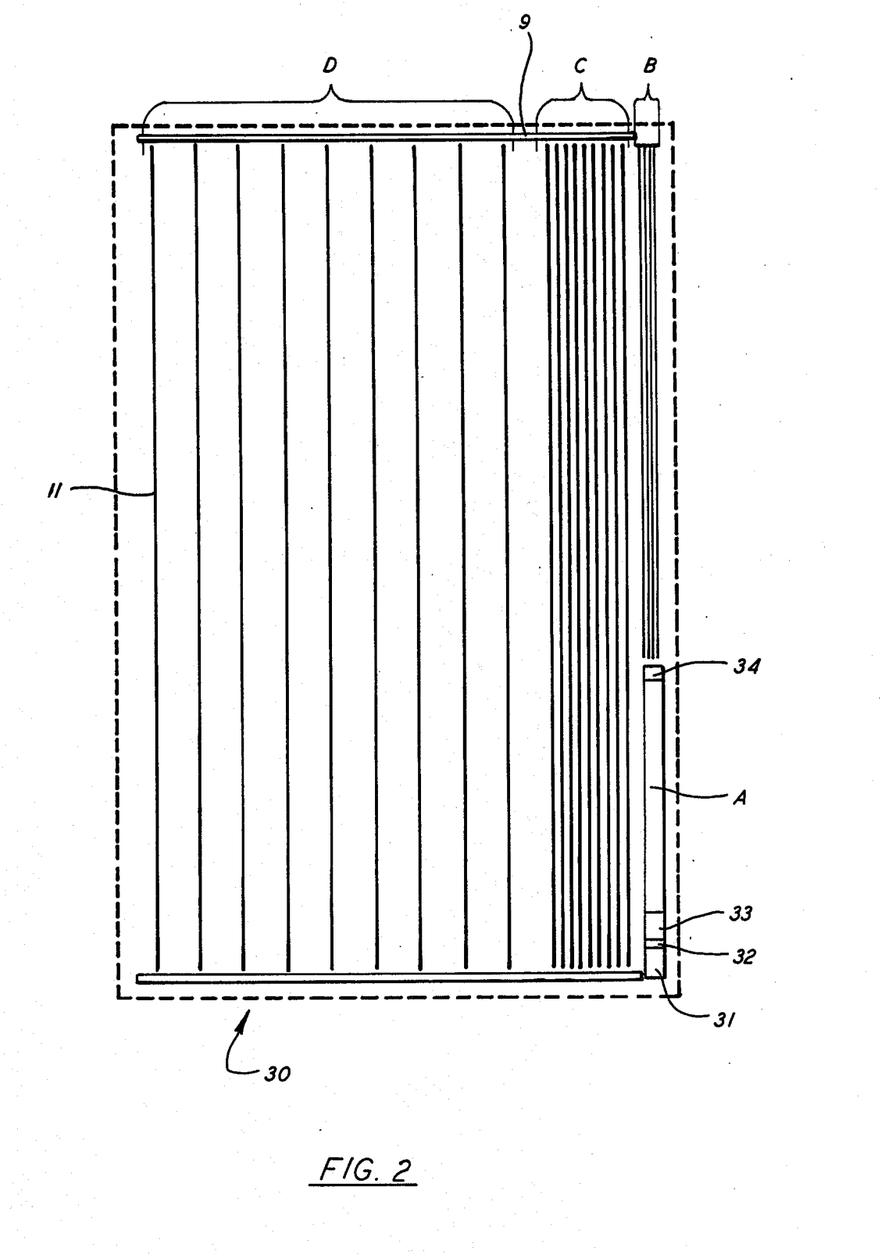
FIG. 2 is a schematic diagram of a plant cultivation system using the channels of FIG. 1 arranged in straight parallel rows.

Turning next to FIG. 2, a complete plant cultivation system 30 using channels according to one embodiment of the invention is shown in schematic form. The method of the invention will be explained in relation to this system using, as an example, a crop such as lettuce. System 30 includes a number of channels 11 which are arranged in straight parallel rows, preferably in a hothouse to provide a controlled ambient environment for the plants.

Crop production commences with placement of a number of cultivation blocks on a conveyor belt at a initial station 31, where the blocks are watered-up. A seed is sown in each block at station 32, and the seeds germinate at station 33. At the end of the germination stage, the blocks are set apart by a small predetermined distance and the plants enter a pre-nursing phase designated A. At the end of growth phase A the plants have reached station 34 at the end of the conveyor belt. At that point they are transferred to a first group of channels where they remain for a nursling phase B. In these channels, as well as all succeeding groups of channels, the necessary cultivation-regulating media are supplied in the manner previously described.

After a suitable period in the nursling phase, the plants are sorted manually and transported to one portion of a next set of channels for a further growth phase C. At the same time a previous batch of plants in another portion of the next set of channels is entering a final growth phase D.

Using the above-mentioned lettuce crop as an example, the time of each growth phase, the spacing of the plants in the channels, and the spacing between channels is shown in Table I.

TABLE I

| Growth Phase | Time In Phase (Days) | Plant Spacing In Channel (cm) | Spacing Between Channels (cm) | Time For Transfer (Days) |
|---|---|---|---|---|
| A | 10–14 | 2 |   | 10–14 |
| B | 10–14 | 4 | 4 | 20–28 |
| C | 10–14 | 16 | 4 | 30–52 |
| D | 10–14 | 16 | 16 | 40–66 |

Figure 3:
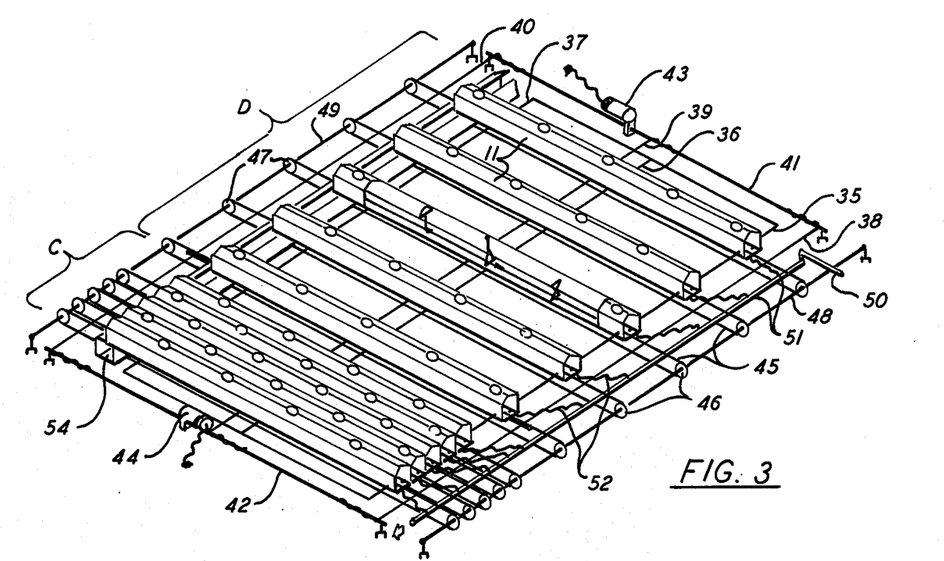
FIG. 3 is a perspective view in simplified semi-schematic form of a set of channels arranged according to the system of FIG. 2.

Referring to FIG. 3, the final phases C and D of the system of FIG. 2 are illustrated in more detail. The set of channels 11 is strung on transverse wires 35, 36 and 37 so that they can be displaced sideways by means of cables 38, 39 and 40 wound on rollers 41 and 42, the rollers being driven by electric motors 43 and 44.

Conveyor belts, illustrated schematically by wires 45 trained over pulleys 46, 47 driven by shafts 48, 49, carry the plants into the channels at one end and out at the other end. A header pipe 50 supplies fluid cultivation-regulating media under pressure through spaced outlets 51 and flexible tubing 52 to inlet connectors 53 (see FIG. 1) to a duct 15 of each channel. Surplus fluid drains out of the other ends of the channels (which are inclined as necessary for the purpose) into an open trough 54. From the trough the liquid may be directed to the previously mentioned receptacle tank, from which it can be directed for re-use after proper analysis to guarantee that the proper nutritive quality is maintained.

Figure 4:
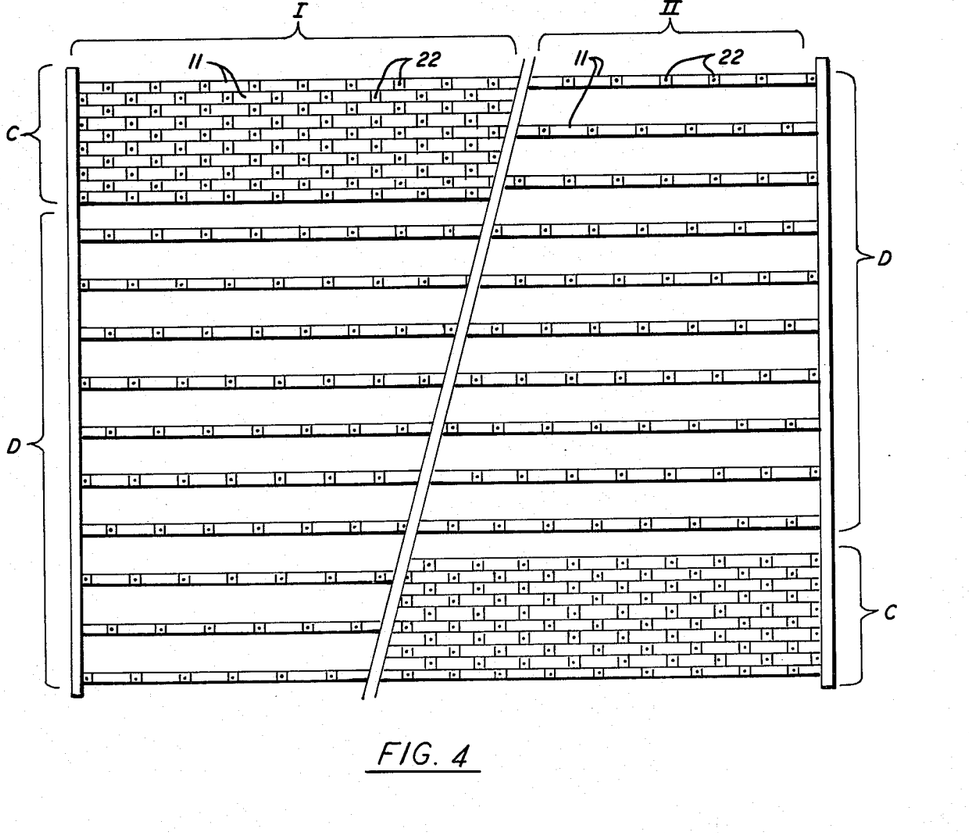
FIG. 4 is a top view in schematic form of channels arranged according to the system of FIG. 2, the view being split to show two phases in the cultivation cycle.

As shown in FIG. 4, the method of properly spacing successive crops of plants using the system of FIGS. 2 and 3, involves setting one portion of the set of parallel channels at a first predetermined close spacing for growth phase C and the other portion of the set at a second predetermined greater spacing for growth phase D.

In FIG. 4, the channels are shown arranged for one crop cycle, designated by I. In cycle I, the plants in the upper portion of the set of channels are entering growth phase C, and the plants in the lower portion are entering growth phase D. At the end of these phases (10–14 days later for lettuce), the plants in the lower portion are harvested. The lower portion channels are then shifted close together and the upper portion channels are shifted apart for the next crop cycle II.

A new group of plants just entering phase C is then delivered to the lower portion of the set of channels. The crop cycles can be continued in this manner; so that optimum plant spacing is always maintained in a total constant growing area. It will be noted from the drawing that the spacing of plants 22 in each channel is shown the same for both growth phase C and phase D. This obviously simplifies handling at the loss of some available space for additional plants in phase C.

Figure 5:
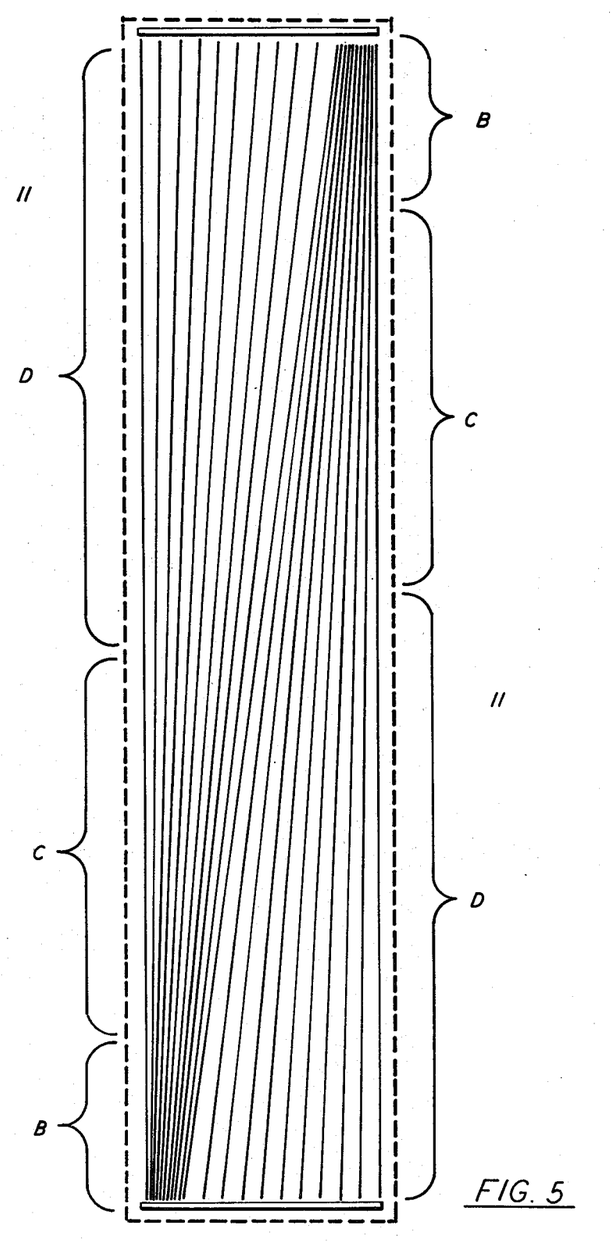
FIG. 5 is a schematic diagram of an alternative system embodiment in which two sets of straight channels are arranged in opposed diverging or fan patterns.
Figures 6, 8:
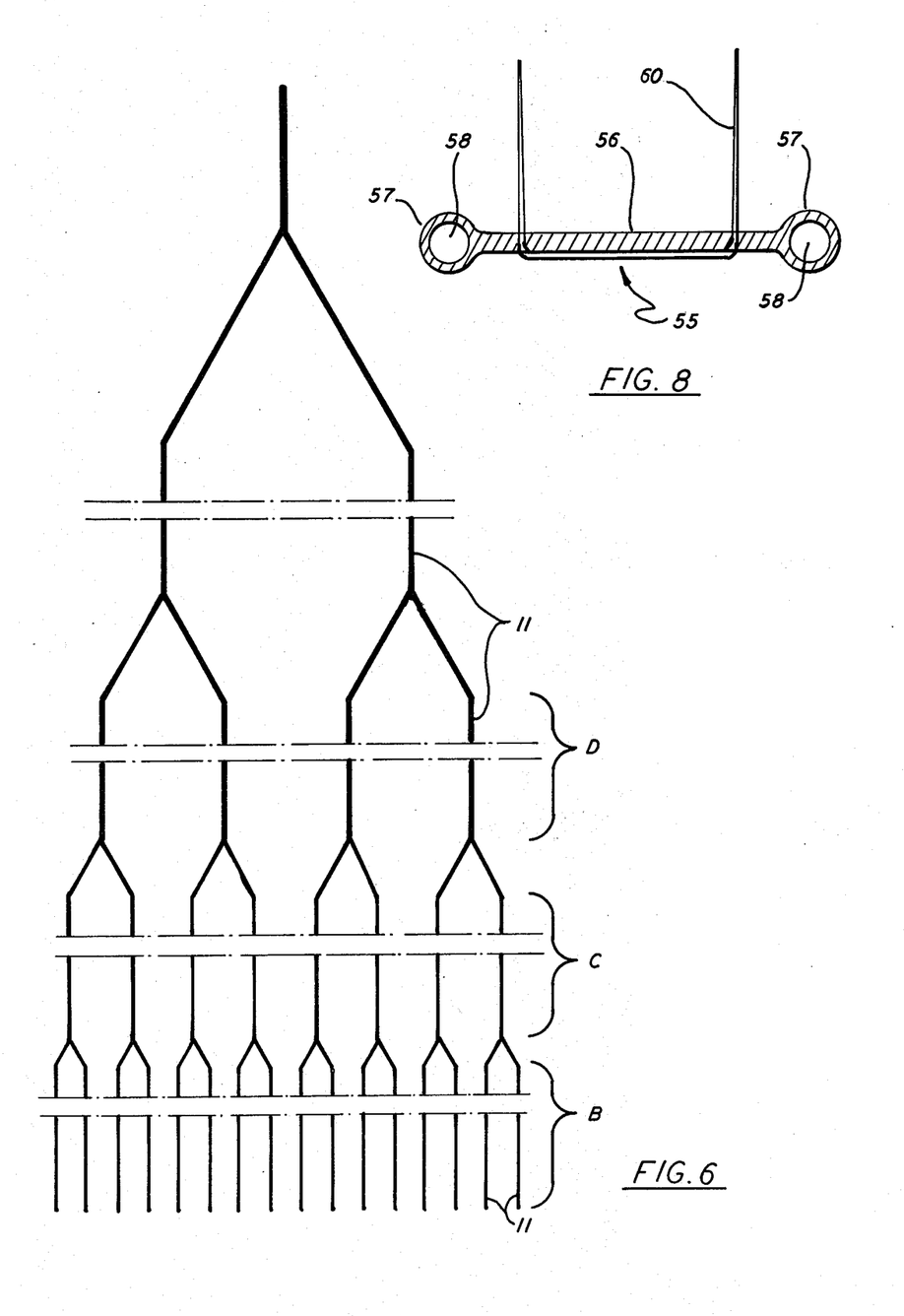
FIG. 6 is a schematic diagram of another system embodiment in which pairs of adjacent parallel channels merge into respective single channels extending in the direction of plant movement.
FIG. 8 is a cross-sectional view of another embodiment of an elongated plant support member adapted for use in the channel of FIG. 1.
Figure 7:
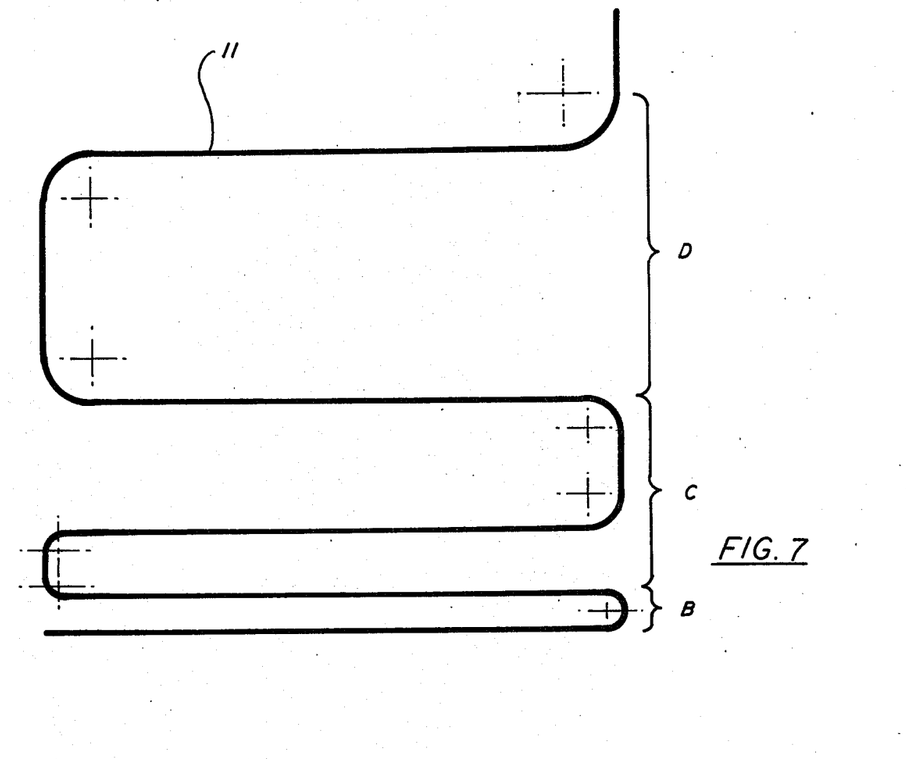
FIG. 7 is another system embodiment in which a continuous channel is arranged in serpentine form with the space between adjacent loops increasing in the direction of plant movement.

FIGS. 5–7 illustrate alternative channel arrangements for achieving increased plant spacing. In the arrangements of FIGS. 5 and 7 the plants move progressively through successive growth stages B, C and D on a single conveyor system without any need to transfer to other channels.

Referring to FIG. 5, two groups of straight channels 11 are arranged in opposed diverging, fan-shaped patterns. This arrangement allows the two groups to be accommodated within a single hothouse. The channels in each group remain fixed in position, but the conveyor system in each channel may be provided with devices for increasing the spacing between individual plants as they progress on the conveyor belts through each growing phase. Several embodiments of such devices are shown in FIGS. 10–18 and will be described below. It will be apparent from FIG. 5 that as the plants move progressively through the channels from growth phase B to phase D, the spacing between corresponding plants in adjacent channels will increase because of the divergent arrangement of the channels.

In FIG. 6 a number of channels 11 are arranged in parallel pairs in the lower part of the figure. Plants entering growth phase B are delivered to these channels. At the end of phase B, the plants in each pair are transferred directly to a single channel for growth phase C. Each pair of channels in phase C then deliver plants to a single channel in phase D. The system can be similarly extended through further phases until it eventually ends in a single channel, after which the plants are adequately developed. At each phase the channels may be differently dimensioned and provided with a cultivation-regulating media supply tailored for that paritcular phase.

In FIG. 7 a channel 11 is arranged in an expanding serpentine form, allowing plants to progress through growth phases B, C and D, as indicated, in a single channel as in the case of the fan pattern shown in FIG. 5. The spacing between adjacent loops of the winding pattern of FIG. 7 increases from loop to loop; so that during phases B, C and D a suitable distance can be maintained between plants in adjacent channel sections. As in the arrangement of FIG. 5 conveyor belts equipped with devices for increasing the spacing between adjacent plants as they progress through the channel can be used, if desired.

Figure 9:
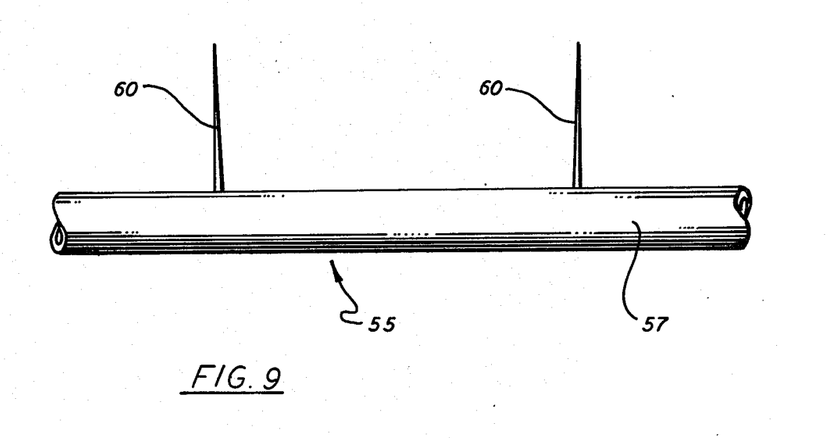
FIG. 9 is a side view of the elongated support member of FIG. 8.

Referring next to FIGS. 8 and 9, an elongated support member 55 is shown which is of different design than member 20 in FIG. 1. Member 55 is in the form of a belt having a flat central section 56 and thickened edges 57, which may be made hollow to provide ducts 58 adapted to carry a flow of cultivation-regulating media to achieve correct growth of plants carried on the belt. The thickened edges of member 55 serve as sides of a reservoir 59 to assure the sufficient nutrient solution is supplied to the root systems of plants carried on the belt.

In applications where the plants are to be maintained at a fixed spacing on the belt, U-shaped pins 60 may be inserted at intervals through the belt and an individual root support block transfixed on each pin (see FIG. 1). In this way, the plants can be transported through the channels on the belts in either direction, forward or backward. On the other hand, the root support blocks can be placed on the belt in front of the pins, allowing the plants to be fed forwards into the channels.

Figure 10:
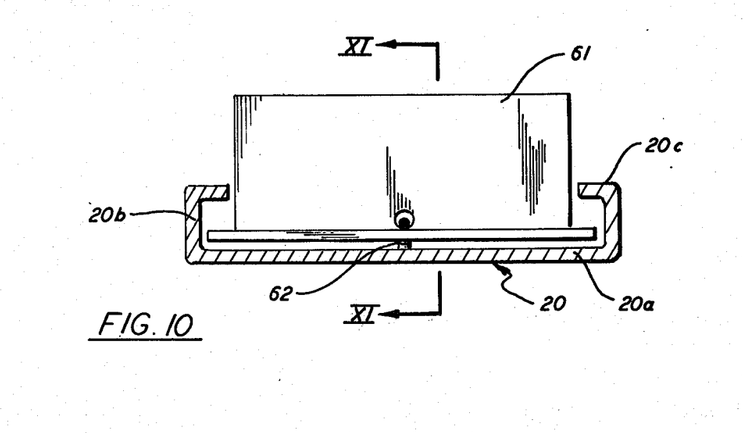
FIG. 10 is a cross-section of the elongated support member embodiment shown in FIG. 1 with carrier sections, for an individual plant root support bed.
Figure 11:
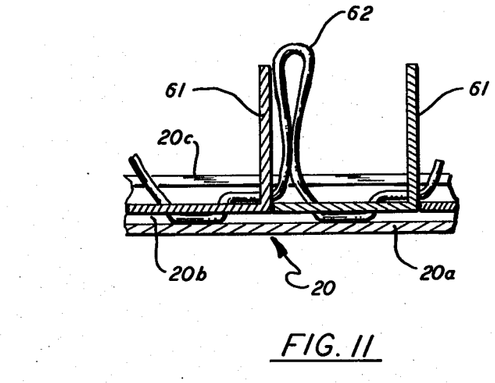
FIG. 11 is a side view in section taken on line XI—XI of FIG. 10 of the elongated support member with a number of carrier sections joined by flexible lines and spaced closely adjacent to one another.
Figure 12:
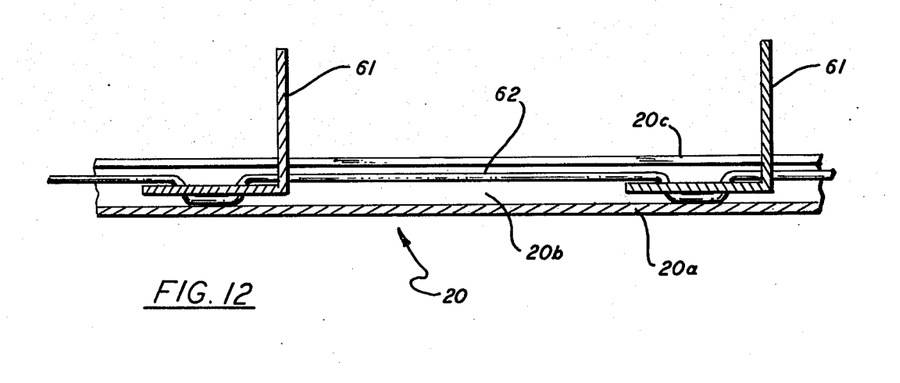
FIG. 12 is a side view similar to FIG. 11 but with the carrier sections spaced apart to the maximum extent allowed by the flexible lines.

FIGS. 10–12 illustrate a simple apparatus for obtaining increased spacing between adjacent plants on a conveyor belt 20. The channel structure in which the conveyor belt slides is not shown, to avoid unnecessary detail, but it is clear that belt 20 can be installed in a channel such as that shown in FIG. 1.

In the embodiment of FIGS. 10–12, a number of right angle carrier sections 61 are connected together by a flexible line 62 in such a way that the carrier sections, each of which is adapted to carry an individual plant root support bed, may be set next to each other in tandem when the plants are in the nursling phase (see FIG. 11). By pulling on the flexible line, the distance between carrier sections may be increased until the line becomes taut, as shown in FIG. 12. This position corresponds to the desired spacing for the plants when fully developed.

Figure 13:
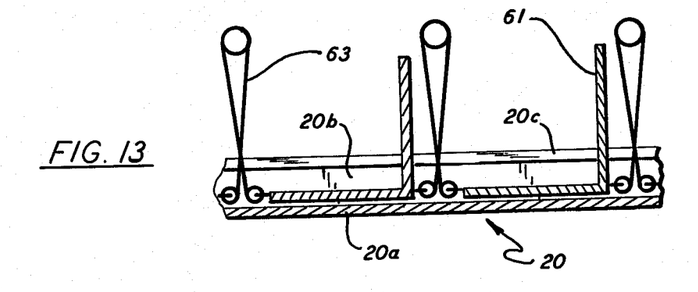
FIG. 13 is a side view in section of the elongated support member embodiment of FIG. 1 with carrier sections joined in closely spaced arrangement by spring means in contracted condition.
Figure 14:
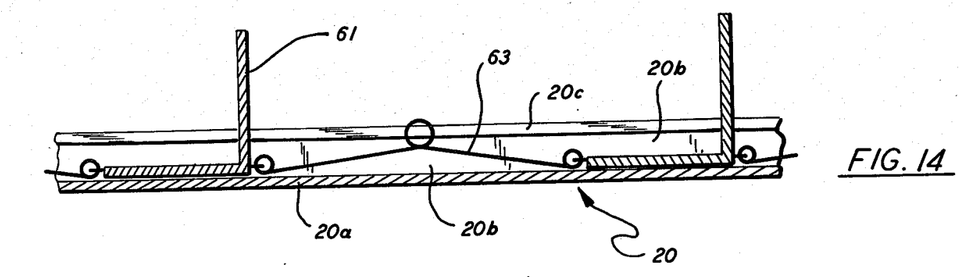
FIG. 14 is a side view of the embodiment of FIG. 13 with the carrier sections spaced apart and with the spring means in extended condition.

FIGS. 13 and 14 illustrate another embodiment of apparatus for varying the plant spacing in each channel. This embodiment offers infinite variation between minimum and maximum spacings between adjacent plants. This embodiment includes carrier sections 61, just as in the embodiment of FIGS. 10–12, but adjacent sections are connected by spring means 63. When no external tension is exerted on the line of carrier sections, the spring means keep the line of carrier sections close together, as shown in FIG. 13. By exerting a pulling force on the line of carrier sections, the spring means are extended, thereby increasing the spacing between sections until the springs are fully extended, as shown in FIG. 14. The spacing distance between adjacent carrier sections can be regulated between the minimum and maximum spacings, depending on the pulling force exerted.

Figure 15:
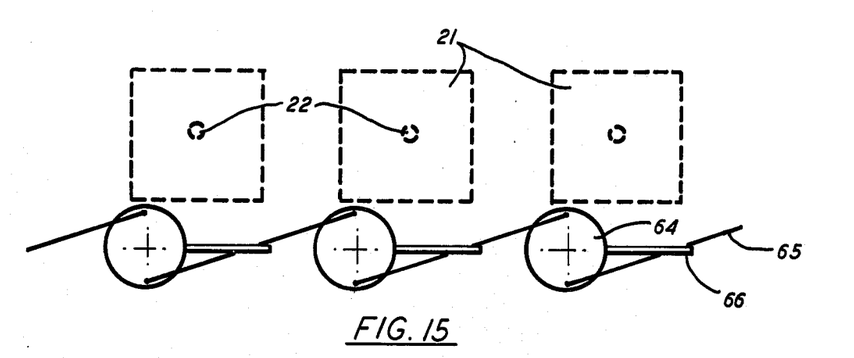
FIG. 15 is a schematic diagram of coiler apparatus for changing the spacing of individual plant beds on a conveyor belt, the coilers being in retracted condition.
Figure 16:
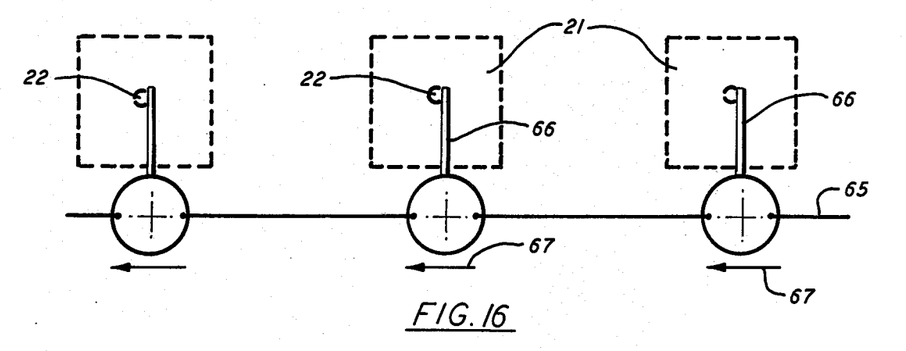
FIG. 16 is a schematic diagram of the apparatus of FIG. 15 with the coilers in extended condition.

Referring to FIGS. 15 and 16, individual plant support beds 21 can be conveyed along the elongated support member in a channel (not shown here for sake of clarity) by a carrier device comprising a number of coilers 64 connected by wire lengths 65. When no external tensile force is applied to the coiler apparatus, the coilers coil up the wire, as shown in FIG. 16. An arm 66 is attached to each coiler such that the arms are swung-in parallel to the line of plants on the belt when the apparatus is in the coiled-up condition. If tension is applied to the wire in the direction of arrows 67 in FIG. 16, the arms will swing out and push the individual plant beds in the direction of the arrows, as shown in FIG. 16. At the same time the spacing between individual beds is increased as the wire lengths 65 uncoil from the coilers.

Figure 17:
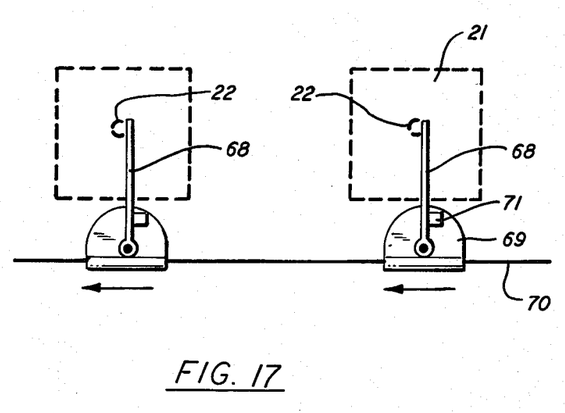
FIG. 17 is a schematic diagram of another embodiment of apparatus for changing the spacing of individual plant beds on a conveyor belt comprising a plurality of holders spaced on a wire with rotatable carrier arms in turned-out position.
Figure 18:
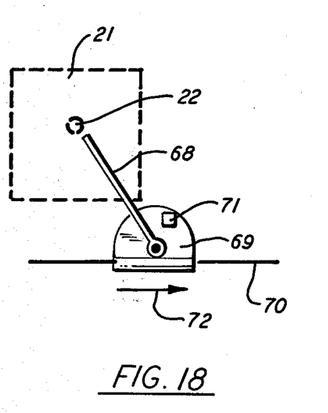
FIG. 18 is a schematic diagram of one of the carriers of FIG. 17 with the carrier arm in turned-in position.

Finally, spring-loaded carrier arms 68 pivotally mounted on holders 69 spaced on wire 70 may be used for the same purpose, as shown in FIGS. 17 and 18. If desired, wire 70 may be resilient (i.e., elastic) and consequently yielding. Each arm bears resiliently against a stop 71 in the turned-out position of the arm, shown in FIG. 17. When returning in the direction indicated by arrow 72 towards the right in FIG. 18, the arm turns in which passing plant 22. Then by a forward pull in the direction of arrow 73, towards the left of FIG. 17, the arm swings out, taking the plants 22 along. By increasing the length of wire between holders 69, the distance between the adjacent beds 21 on the belt will be correspondingly increased.

As mentioned earlier, the flexible opaque flaps used to close the top of the channels prevent loss of moisture from the channels. This assures a high humidity inside the channels, which also prevents choking the duct outlets 16 with crystallized nutrient salts from the cultivation-regulating media. The flaps also reduce condensation on the leaves, with consequently diminished likelihood of fungus attacks or other leaf diseases. In addition, the barring the light from the interior of the channels by the opaque flaps assists root growth and prevents the development of algae, which otherwise would compete with the plants for the oxygen and nutrients from the cultivation-regulating media.

As an example of the effectiveness of the present invention in improving plant production, the system illustrated by FIGS. 2 and 3 has been used in Denmark to increase yields from typical values of about 150–200 $p/m^2$ of growing area per year, for conventional growing methods, to about 400–500 $p/m^2$ of growing area per year. At the same year, the total growing time, from sowing to harvesting, has been reduced by about one week, compared to conventional methods.

I claim:

1. A method for cultivating in a minimum area plants growing singly in individual porous root support beds that comprises:
   arranging linearly spaced individual beds of single plants on support surfaces in at least two adjacent horizontal channels, the support surfaces being spaced above the bottoms of the respective channels;
   continuously flowing fluid cultivation regulation media into each channel to supply said media to the individual beds in the channel;

continuously draining off residuary noxious substances from the plants in the space between the support surface and the bottom of each channel;

increasing the spacing between adjacent beds in each channel during the growth cycle in accordance with the space required by the growing plants and increasing the spacing between beds in adjacent channels during the growth cycle, in accordance with the space required by the plants, so that the spacings between individual beds in adjacent channels as well as in each channel are increased progressively during the growing cycle to accommodate the growth of the plants.

2. The method of claim 1 wherein corresponding plants in at least two adjacent channels are at the same stage of development.

3. The method of claim 2 wherein the adjacent channels are straight and parallel on the same level, and the step of increasing the spacing between beds in adjacent channels comprises shifting at least one channel parallel to itself.

4. The method of claim 2 wherein the at least two adjacent channels are straight, on the same level, and diverge from one end to the other, and the step of increasing the spacing between beds in adjacent channels comprises moving the beds progressively from the one end of each channel to the other end as the plants mature.

5. The method of claim 2 wherein the individual beds are arranged in at least two pairs of straight, parallel channels on the same level, the method further comprises moving the beds in the same direction along each channel from one end to the other end, and the step of increasing the spacing between beds in adjacent channels comprises joining the other ends of each adjacent pair of channels to a single further channel extending in the same direction intermediate said pair of channels, and moving the beds in said same direction from each pair of channels into the respective further channel.

6. The method of claim 1 wherein the step of arranging the individual beds in at least two adjacent horizontal channels comprises arranging the beds in a continuous serpentine channel, with adjacent loops of the serpentine forming said adjacent channels, the distance between each successive loop of the continuous channel and the preceding loop being progressively increased, and the method further comprises moving the beds progressively along the continuous channel as the plants mature.

7. A method for cultivating in a minimum area plants growing singly in individual porous root support beds that comprises in sequence:

arranging a plurality of linearly spaced individual beds of single plants, all at a first stage of development, in at least two adjacent channels of a set of straight parallel channels on the same level, said at least two adjacent channels being spaced apart at a first predetermined distance smaller than the spacing between at least two additional channels of the set adjacent to said first named at least two adjacent channels;

continuously flowing fluid cultivation regulating media into each of said at least two adjacent channels to supply said media to the individual beds in said channels;

continuously draining off any residuary noxious substances produced by the plants from the bottom of each channel;

increasing the spacing between adjacent ones of said at least two adjacent channels of the set of channels by shifting the at least two adjacent channels parallel to themselves until the spacing between said channels is equal to a second predetermined spacing between each bed when the plants have reached a second stage of development;

decreasing the spacing between the at least two additional channels of the set so that the total area occupied by the set remains constant; and arranging an additional plurality of linearly spaced beds of single plants, all at said first stage of development, in said at least two additional channels of the set of channels.

8. The method of claim 7 comprising the further steps in sequence of:

removing the beds of plants successively from one end of the first named at least two adjacent channels when the plants therein have reached a third stage of development;

decreasing the spacing between said at least two adjacent channels of the set to said first predetermined distance;

increasing the spacing between the at least two additional channels of the set; and arranging a third plurality of linearly spaced beds of single plants, all at said first stage of development, in each of the first named at least two adjacent channels of the set.

9. Apparatus for cultivating in a minimum space plants growing singly in individual porous root support beds, the apparatus comprising:

an elongated U-shaped channel having a bottom and a pair of spaced upright sides, each side having an upper margin parallel to the bottom of the channel;

guides extending the length of the interior face of each of the sides of the channel parallel to and spaced between the bottom and the upper margins of the sides;

an elongated member supported by said guides along the length of the channel and adapted to support individual porous root support beds of single plants spaced above the bottom of the channel; and at least one continuous duct extending the length of the channel along the interior surface of at least one of the sides, said at least one duct having longitudinally spaced outlets adapted to deliver liquid cultivation-regulating media from the duct to the interior of the channel above the elongated member, the space between the member and the bottom of the channel being adapted to carry off surplus liquid cultivation-regulating media drained from said member.

10. Apparatus according to claim 9 comprising a pair of flexible opaque flaps, each flap being attached to the upper margin of a respective side of the channel and extending upwardly and inwardly therefrom, and the flaps terminating in a pair of adjacent lips extending the length of the channel, the lips being adapted to yieldingly embrace the stems of plants in the channel to permit vertical growth and longitudinal movement of such plants in the channel while reducing the loss of moisture from the channel and barring light from the interior of the channel.

11. Apparatus according to claim 9 wherein the cross section of the elongated member comprises a flat central part and raised side margins to form a reservoir for liquid cultivation-regulating media supplied from said at least one duct.

12. Apparatus according to claim 9 wherein the cross section of the elongated member comprises a flat central part and upright side portions along each lateral edge to form the sides of a liquid reservoir for cultivation-regulating media supplied from said at least one duct.

13. Apparatus according to claim 12 wherein the upright side portions have turned-in upper edges adapted to secure a root complex of plants growing in the channel and restrain root growth out of said reservoir.

14. Apparatus according to claim 9 comprising a plurality of carrier sections for individual plant beds movably aligned along said elongated member and
 a flexible line connecting each of said carrier sections together, the line between each carrier section having a predetermined length equal to the maximum desired spacing between plants growing in plant beds on adjacent carrier sections.

15. Apparatus according to claim 9 comprising a plurality of carrier sections for individual plant beds movably aligned along said elongated member and
 spring means connecting each section to the adjacent section, the spacing between adjacent sections being determined by tension exerted on said spring means.

16. Apparatus according to claim 9 comprising a multiplicity of said elongated channels arranged in straight parallel lines;
 means for supporting said channels for lateral movement transverse to the longitudinal axes of said channels.

17. Apparatus according to claim 16 comprising motorized means for laterally shifting said elongated channels on said supporting means.

18. Apparatus according to claim 16 comprising
 a header extending perpendicularly to the longitudinal axes of said channels adjacent to one end thereof for supplying fluid growth-regulating media under pressure and
 a multiplicity of flexible tubes, each tube connected between one of a multiplicity of outlets spaced along the length of the header and a respective one of the multiplicity of channels for delivering liquid growth-regulating media from said header to one end of each channel while permitting lateral shifting of said channels on said supporting means.

19. Apparatus according to claim 18 comprising an open trough extending perpendicularly to the longitudinal axes of said channels directly underneath the ends thereof for carrying away surplus liquid growth-regulating media drained from the space between the elongated member and the bottom of each channel.

20. Apparatus for changing the spacing of individual plant beds on a conveyor belt comprising a plurality of linearly spaced spring-actuated coilers adapted to extend along one side of a conveyor belt, a carrier arm mounted on each coiler for rotation therewith, and a length of wire connecting each coiler to the adjacent coiler and adapted to be would thereon by the actuating spring of the coiler and to be unwound in response to tension exerted through said connecting wire the carrier arms being turned and adapted to contact corresponding plant beds spaced along the conveyor belt and push said beds further apart with increasing tension in said connecting wires.

21. Apparatus for changing the spacing of individual plant beds on a conveyor belt comprising a plurality of holders spaced on a wire adapted to extend along one side of a conveyor belt and a carrier arm pivotally mounted on each holder and bearing resiliently against a stop with the arm perpendicular to the wire so that the arm is adapted to extend across the conveyor belt to contact an individual plant bed for moving the bed along the belt when the wire is pulled in one direction and to swing in away from the stop when the wire is pulled in the opposite direction.

* * * * *